United States Patent
Yoshida et al.

(10) Patent No.: US 6,224,741 B1
(45) Date of Patent: May 1, 2001

(54) ELECTROLYTE PROCESS USING A HYDROGEN STORING METAL MEMBER

(75) Inventors: Yasuki Yoshida; Setsuro Ogata; Masaharu Uno; Masashi Tanaka; Yoshinori Nishiki, all of Kanagawa; Takayuki Shimamune, Tokyo; Hiroshi Inoue; Chiaki Iwakura, both of Osaka, all of (JP)

(73) Assignee: Peremelec Electrode Ltd., Kanagawa (JP)

( * ) Notice: Subject to any disclaimer, the term of this patent is extended or adjusted under 35 U.S.C. 154(b) by 0 days.

(21) Appl. No.: 09/131,677

(22) Filed: Aug. 10, 1998

(30) Foreign Application Priority Data

Aug. 8, 1997 (JP) .................................................. 9-225568
Aug. 8, 1997 (JP) .................................................. 9-225569

(51) Int. Cl.[7] ............................................................ C25B 1/02
(52) U.S. Cl. ............................................ 205/637; 205/633
(58) Field of Search ................................ 205/637, 633, 205/636; 420/900; 429/17, 218.2, 40, 44

(56) References Cited

U.S. PATENT DOCUMENTS

| | | | |
|---|---|---|---|
| 4,144,189 | * 3/1979 | Kirkbride | 502/5 |
| 4,265,720 | * 5/1981 | Winstel | 205/637 |
| 4,539,086 | * 9/1985 | Fujita et al. | 205/335 |
| 5,954,928 | * 9/1999 | Kishi et al. | 204/290 R |

* cited by examiner

Primary Examiner—Kathryn Gorgos
Assistant Examiner—Wesley A. Nicolas
(74) Attorney, Agent, or Firm—Sughrue, Mion, Zinn, Macpeak & Seas, PLlC

(57) ABSTRACT

An electrolytic process which can operate in a hydrogen reaction chamber at a hydrogen reaction rate corresponding to the increase in the rate of production of hydrogen accompanying the increase in the electrolysis rate and maintain the current efficiency at a very high value with respect to the electrolytic current for producing hydrogen and a process for the production of an electrode for this purpose. An electrolytic process is provided which comprises effecting electrolysis of an electrolytic solution in an electrolytic chamber separated from a reaction chamber by a hydrogen-storing metal member with one surface of the hydrogen-storing metal member as a cathode opposing an anode so that hydrogen thus produced is adsorbed by the hydrogen-storing metal member while allowing hydrogen thus adsorbed and a material to be treated to undergo continuous catalytic reaction in the reaction chamber on the other surface of the hydrogen-storing metal member to cause hydrogenation or reduction reaction by hydrogen thus adsorbed.

4 Claims, 3 Drawing Sheets

ELECTROLYTE PROCESS USING A HYDROGEN STORING METAL MEMBER

FIELD OF THE INVENTION

The present invention relates to an electrolytic process which comprises a continuous reaction in which active hydrogen converted from hydrogen produced by electrolysis takes part, e.g., a hydrogenation reaction and a hydrogen reduction reaction, an apparatus therefor and a process for the production of an electrode for use in such an electrolytic apparatus.

BACKGROUND OF THE INVENTION

A hydrogen reaction in which active hydrogen takes part, e.g., a hydrogenation reaction of organic material is employed in various chemical fields. In accordance with the cracking reaction of petroleum, for example, gasoline or kerosine can be obtained from heavy oil. Further, reaction which comprises liquefying tar content so that it is adapted more for the purpose is actually practiced. Moreover, the conversion of unsaturated hydrocarbon to saturated hydrocarbon is practiced.

Some hydrogenation reactions are often allowed to proceed in a uniform system. For example, an organic material is hydrogenated in the presence of a contact catalyst. It is known that a noble metal such as palladium is an excellent catalyst for the hydrogenation reaction of an unsaturated organic compound (S. Siegel, in "Comprehensive Organic 25 Synthesis", ed., B. M. Trost and I. Fleming, Pergamon Press, Oxford, 1991, vol. 8). These reactions are disadvantageous in that they require a high pressure reaction vessel or normally require a relatively high temperature that can cause the explosion depending on the purity of the hydrogen gas used in hydrogenation. These reactions are also disadvantageous in that the catalyst used has an insufficient reaction selectivity and thus side reactions can occur.

In order to enhance reaction selectivity and reduce energy consumption, electrolytic reduction, which is a heterogenous system reaction, may be employed as described in A. M. Couper, D. Pletcher and F. C. Walsh, "Chem. Rev.", 1990, 90, 837, T. Nonaka, M. Takashashi and T. Fuchigami, "Bull. Chem. Soc. Jpn.", 182 56, 2584, M. A. Casadei and D. Pletcher, "Electrochim. Acta, 33, 117 (1988), T. Yamada, T. Osa and T. Matsue, "Chem. Lette.", 1989 (1987), L. Coche, B. Ehui, and J. C. Moutet, "J. Org. Chem.", 55, 5905 (1990), and J. C. Moutet, Y. Ouennoghi, A. Ourari and S. Hamar-Thibault, "Electrochim. Acta", 40, 1827 (1995). An electrode catalyst having a large surface area such as Raney nickel can be used for an electrochemical hydrogenation reaction and thus can be expected to provide a high power efficiency. Further, such an electrode catalyst provides safe and easy operation. However, this system requires that the organic material to be treated be electrically conductive. Otherwise, an additive must be added to the organic material to render the organic material electrically conductive.

As described above, hydrogenation reactions can be divided into two types, i.e., homogeneous system reactions and heterogeneous system reactions. It is known that atomic hydrogen produced on the catalyst acts to accelerate the reaction in either case.

As one of other processes for safely effecting hydrogenation reaction at a high efficiency, a process is known which comprises bringing the reaction compound to be hydrogenated into contact with palladium or other hydrogen-storing metals (metal hydride) having hydrogen held therein. It is said that palladium or many hydrogen-storing alloys also have a catalytic action in this reaction and thus can fairly act in the reaction. However, this process is disadvantageous in that once hydrogen adsorbed in the hydrogen-storing metal alloy or palladium is consumed for the reaction with a small amount of the reactant, the reaction no longer proceeds even if the remaining reactant is left unreacted. Thus, this process can be performed batchwise only. This process can be performed reasonably well on an experimental basis but at an extremely low efficiency on an industrial basis.

In order to solve these problems, the inventors proposed the following process and apparatus. In other words, electrolysis is effected in an electrolytic solution with one surface of a plate-like hydrogen-storing metal as a cathode to produce hydrogen. The hydrogen thus produced is then adsorbed by the plate-like hydrogen-storing metal at one surface thereof. The hydrogen is diffused into the hydrogen-storing metal through which it moves to the other surface thereof. The reactant to be hydrogenated is brought into contact with the other surface of the hydrogen-storing metal at which a hydrogenation reaction or a reduction reaction by hydrogen is continuously effected. It has been obvious that this process and apparatus can find wide application in the industry and can produce a hydrogenated product at a high efficiency.

However, this reaction process is disadvantageous in that the hydrogenation reaction often is a rate-limiting step. The inventors made extensive studies of this reaction process. As a result, the following facts were found. When the current density is raised to accelerate the production of hydrogen by electrolysis, the rate of production of hydrogen exceeds the highest allowable value for hydrogenation reaction at an early stage. Even if hydrogen is present in excess, the hydrogen-storing metal can keep adsorbing and holding hydrogen. Therefore, hydrogen thus produced is rarely wasted. However, this is limited. If the current density is raised beyond a predetermined value, the current efficiency is reduced so much. In other words, this reaction process is disadvantageous in that the productivity of hydrogenated product cannot be increased beyond a certain limit.

SUMMARY OF THE INVENTION

It is therefore one object of the present invention to provide an electrolytic process and apparatus which can operate in the hydrogen reaction chamber at a hydrogen reaction rate corresponding to the increase in the rate of production of hydrogen accompanying the increase in the electrolysis rate and maintain the current efficiency at a very high value with respect to the electrolytic current for producing hydrogen.

Another object of the present invention is to provide a process for the production of an electrode for the above purpose.

The above-described objects of the present invention are accomplished by the following embodiments of the present invention:

(1) An electrolytic process which comprises effecting electrolysis of an electrolytic solution in an electrolytic chamber separated from a reaction chamber by a hydrogen-storing metal member with one surface of the hydrogen-storing metal member as a cathode opposing an anode so that hydrogen thus produced is adsorbed by the hydrogen-storing metal member while allowing hydrogen thus adsorbed and a material to be treated to undergo continuous catalytic reaction in the reaction chamber on the other surface of the hydrogen-storing metal member to cause a hydrogenation or reduction reaction by hydrogen thus adsorbed, wherein that an electrolytic apparatus having a porous catalyst layer provided on the catalytic reaction surface of the hydrogen-storing metal member is used.

(2) An electrolytic apparatus comprising an electrolytic chamber and a reaction chamber separated by a hydrogen-storing metal member, an electrolytic solution charged in the electrolytic chamber, and an anode provided opposing the hydrogen-storing metal member in the electrolytic chamber as a cathode, wherein that the hydrogen-storing metal member comprises a porous catalyst layer taking part in a hydrogen reaction on at least a part of the surface thereof in contact with the reactive compound in the reaction chamber.

(3) The electrolytic apparatus according to embodiment (2) above, wherein the hydrogen-storing metal is palladium or an alloy thereof, the porous catalyst layer is a metal black belonging to the platinum group or gold and the hydrogen reaction in which the catalyst takes part is a reduction reaction involving the hydrogenation of an unsaturated hydrocarbon.

(4) The electrolytic apparatus according to embodiment (2) above, wherein the porous catalyst layer formed on the surface of the hydrogen-storing metal member is obtained by bringing a hydrogen-storing metal member which has adsorbed hydrogen into contact with an electroless plating solution containing a catalyst component so that the surface of the hydrogen-storing metal member is electrolessly plated with the catalyst metal by the action of hydrogen adsorbed in the hydrogen-storing member.

(5) A process for the production of an electrode which comprises subjecting an electroless plating solution containing a cation of a metal which serves as a catalyst to electrolysis with one surface of a hydrogen-storing metal body being in contact with an electrolytic solution while the other being in contact with the electroless plating solution with the hydrogen-storing metal body serving as a cathode, the cathode being opposed to an anode in contact with the electrolytic solution to produce on the cathode side hydrogen which is then adsorbed in the hydrogen-storing metal body through which hydrogen moves and reaches the other surface thereof on which it is desorbed therefrom to produce active hydrogen by which the metallic cation in the electroless plating solution is reduced so that the hydrogen-storing metal body is plated with the catalyst metal on the surface thereof in contact with the electroless plating solution, whereby the catalyst component is attached to the hydrogen-storing metal body and the contact area for reaction is enlarged.

(6) The process for the production of an electrode according to embodiment (5) above, wherein the hydrogen-storing metal body is a palladium or palladium alloy plate, the metal cation in the electroless plating solution is an ion of a metal belonging to the platinum group or gold and the component which serves as a catalyst to be attached to the hydrogen-storing metal body is a metal black belonging to the platinum group or gold.

(7) The process for the production of an electrode according to embodiment (5) or (6) above, wherein the electroless plating solution contains a cation of at least one metal selected from the group consisting of gold, silver, nickel, copper, lead and metallic elements belonging to the platinum group.

BRIEF DESCRIPTION OF THE DRAWINGS

By way of example and to make the description more clear, reference is made to the accompanying drawings in which.

DETAILED DESCRIPTION OF THE INVENTION

The present invention will be described in more detail below.

In the present invention, a hydrogen reaction is a reaction in which active hydrogen takes part, such as a hydrogenation reaction. Specific examples of hydrogenation reactions include a hydrogenation reaction and a hydrogen reduction reaction. Examples of these hydrogenation reactions include reactions for converting methylstyrene to ethyl toluene, cracking reactions of petroleum, and reactions for producing gasoline or kerosine from heavy oil.

Figure 1:
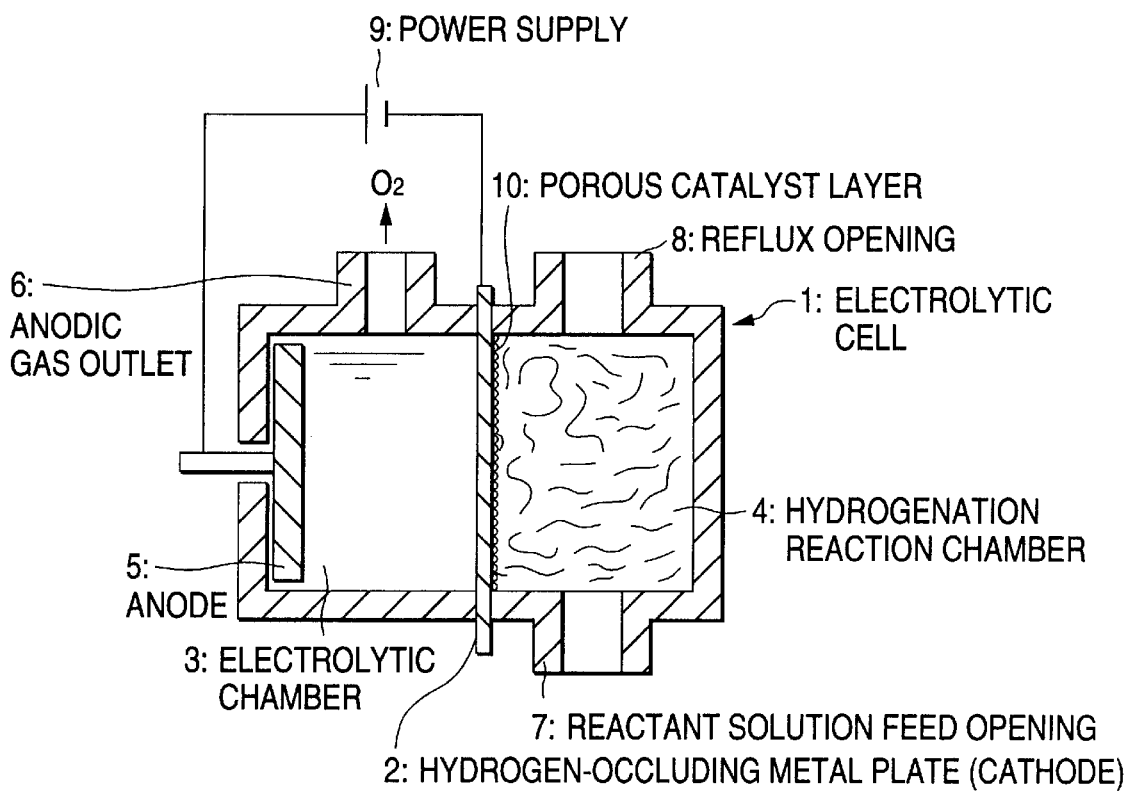
FIG. 1 is a schematic diagram illustrating a section of an electrolytic cell used in the electrolytic process of the present invention.
Figure 2:
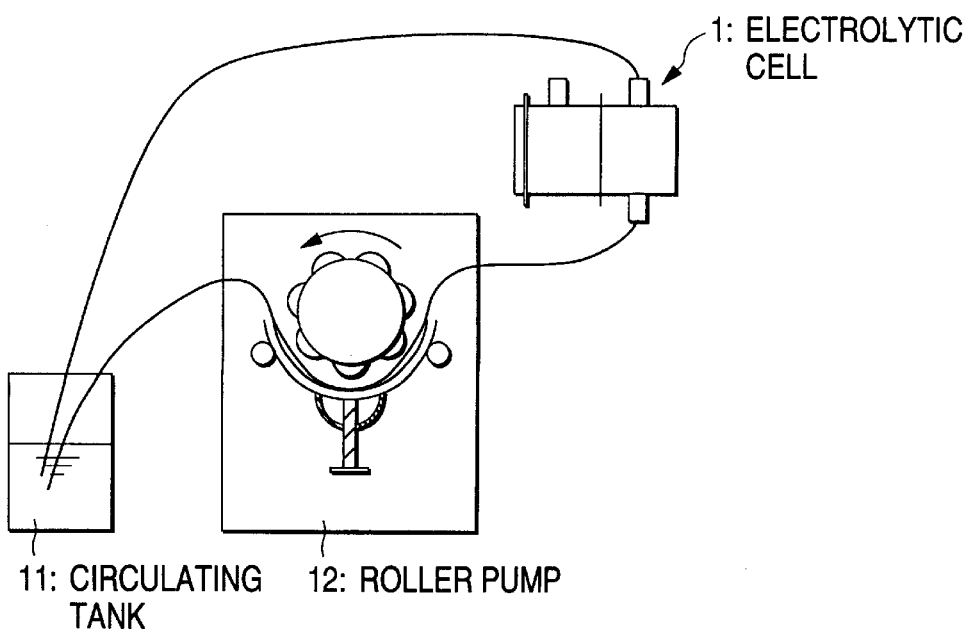
FIG. 2 is a schematic diagram illustrating an embodiment of the electrolytic apparatus of the present invention used in the electrolytic process of the present invention.

FIG. 1 is a schematic diagram illustrating a section of 20 an electrolytic cell used in the electrolytic process of the present invention. FIG. 2 is a schematic diagram illustrating an embodiment of the electrolytic apparatus of the present invention used in the electrolytic process of the present invention.

The electrolytic cell 1 shown in FIGS. 1 and 2 is adapted for the hydrogenation reaction of the reactant. The electrolytic cell 1 is coated with Teflon on the interior side thereof. As shown in FIG. 1, the electrolytic cell 1 is partitioned into an electrolytic chamber 3 and a hydrogenation reaction chamber 4 by a thin plate-like or foil-like hydrogen storing metal plate 2. The hydrogen-storing metal plate 2 has a porous catalyst layer 10 provided on the surface thereof facing the hydrogenation reaction chamber 4. An aqueous solution of potassium hydroxide as an electrolytic solution is charged in the electrolytic chamber 3. The hydrogen-storing metal plate 2 is connected to a power supply 9. The hydrogenstoring metal plate 2 forms a cathode on the electrolytic chamber side thereof. Provided opposed to the cathode 2 and in the vicinity of the side wall is a plate-like anode 5. The anode 5 is made of nickel. However, the anode 5 may be made of stainless steel rather than nickel. The reference numeral 6 indicates an anodic gas outlet in which an electrolytic solution feed opening may be provided.

Provided in the reaction chamber 4 are a reactant solution feed opening 7 and a reflux opening 8. As shown in FIG. 2, a circulating tank 11 connected to the electrolytic cell 1 and a roller pump 12 are provided so that the reactant can be circulated. The electrolytic cell 1 and the circulating tank 11 are communicated to each other via a connecting pipe made of fluororubber.

Into the hydrogenation reaction chamber 4 of the electrolytic cell 1 is supplied a solution of an organic compound such as styrene in an organic solvent from the circulating tank 11 by the action of the roller pump 12. At the same time, the electrolytic chamber 3 is filled with an electrolytic solution such as an aqueous solution of potassium hydroxide as mentioned above. When an electric current from the power supply 9 is applied across the anode 5 and the hydrogen-storing metal plate as a cathode, hydrogen is produced by electrolysis in the electrolytic chamber 3. The hydrogen thus produced is adsorbed by the hydrogen-storing metal plate (cathode) 2. The hydrogen thus adsorbed is then transmitted by the hydrogen-storing metal—plate 2 in the direction perpendicular to the surface thereof. The hydrogen then reaches the hydrogenation reaction chamber side thereof at which it then comes in contact with and hydrogenates the organic compound such as styrene to produce ethylbenzene. During this process, the porous catalyst layer 10 provided on the hydrogenation reaction chamber side of the hydrogen-storing metal plate 2 accelerates the hydrogenation reaction.

The solution containing the reactant thus hydrogenated is circulated through the reflux opening 8 and the circulating tank 11. If necessary, the solution is again hydrogenated in the electrolytic cell 1.

The hydrogen-storing metal plate 2 needs to be electrically-conductive and stable as a cathode during electrolysis. Preferably, the hydrogen-storing metal plate 2 has some catalytic activity for hydrogenation reaction. If possible, the hydrogen-storing metal plate 2 must satisfy the requirements that it should show little volumetric change during occlusion and release of hydrogen and should have little tendency toward embrittlement after repeated adsorption and release of hydrogen. Representative examples of such a material include palladium, which belongs to the platinum group, and palladium alloy. Palladium is known to exhibit an extremely high hydrogen permeability. Further, palladium has some catalytic activity. Thus, palladium is one of the most desirable metals. Palladium alloyed with a small amount of gold or aluminum is resistant to embrittlement and is suitable for many purposes. Lanthanum-nickel alloy, alloy containing a rare earth element such as mischmetal, titanium alloy, zirconium alloy, etc., too, are useful as hydrogen-storing metal plate.

It is usual that the thickness of the hydrogen-storing metal plate is sufficiently thin from the standpoint of efficiency of hydrogenation reaction. In order to subject the hydrogen-storing metal plate to electrolysis as a cathode, the hydrogen-storing metal plate needs to have some thickness. In general, the thickness of the hydrogen-storing metal plate is preferably from 0.01 to 2 mm, but there is no reason why this plate should be limited to this range. It may be properly determined according to the electrolytic conditions. The hydrogen-storing metal plate adsorbs and transmits hydrogen and acts as a power supplying material. Therefore, if used as a part of industrial facilities, the hydrogen-storing metal plate may be made of a metal foil clad with a metal mesh or the like.

In the present invention, the hydrogen-storing metal member used in this electrolytic apparatus comprises a porous catalyst layer 10 provided on the catalytic reaction side thereof, which faces the reaction chamber, to accelerate the hydrogenation reaction.

In some detail, the hydrogen-storing metal member comprises a porous catalyst layer 10 formed on at least a part of the surface thereof in contact with the reaction compound in the hydrogenation reaction chamber 4. The term "catalyst" as used herein is meant to indicate a catalyst which takes part in and accelerates, e.g., a hydrogenation reaction involving the hydrogenation and conversion of styrene to ethylbenzene. Because of its porosity, the catalyst layer allows the hydrogen-storing metal plate to maintain its capability of adsorbing and desorbing hydrogen and hence desorption sites for adsorbed hydrogen on the surface thereof.

The catalyst to be used in the catalyst layer of the hydrogen-storing metal plate is a catalyst which takes part in the hydrogenation reaction. For example, metals belonging to the platinum group, particularly palladium, platinum, iridium and ruthenium can be used. Besides these metals, noble metals such as gold and silver can be used. Further, nickel, copper, lead, etc. can be used. Other catalyst materials may be appropriately selected depending on the kind of the hydrogenation reaction to be effected in the presence thereof. A metal having a catalytic action alone may be selected. However, a catalyst metal is preferably selected which can be easily provided with a surface area large enough to increase the possibility of contact with the reactant. From this standpoint of view, a metal black belonging to the platinum group or gold, particularly palladium black, which is free of luster, is often most desirable. This is because palladium black has a large surface area and thus can form a catalyst layer which exerts an extremely excellent effect of catalyzing the hydrogenation reaction of organic materials. Further, palladium is also capable of adsorbing and desorbing hydrogen besides these capabilities.

The provision of the foregoing catalyst on the hydrogen-storing metal plate in the form of porous layer can be accomplished, e.g., by the following method. In some detail, an electroless plating solution having cations of catalyst metal component dissolved therein is prepared. A hydrogen-storing metal plate having hydrogen adsorbed therein is then allowed to come in contact with the electroless plating solution so that the cations of catalyst metal component are reduced by hydrogen thus desorbed in a required amount. In this manner, the catalyst component thus reduced is attached to the hydrogen-storing metal plate as a deposit having a required sufficient thickness, leaving desorption sites for adsorbed hydrogen.

The catalyst layer thus formed has a structure such that active hydrogen which is desorbed from the hydrogen-storing metal plate to take part in a hydrogen reaction such as a hydrogenation reaction can be supplied from the vicinity of the catalyst. In this arrangement, the catalyst layer can provide a desired product at a far greater efficiency than catalyst layers prepared otherwise.

The electroless plating solution is not specifically limited. If the hydrogen-storing metal plate is plated with platinum or palladium as a catalyst, the electroless plating solution may be hydrochloric acid or sulfuric acid with a salt containing such an element incorporated therein. The salt concentration of the electroless plating solution is preferably from 1 to 100 g/l, and the acid concentration of the electroless plating solution is preferably from 1 to 100 g/l. For example, the electroless plating solution preferably contains HCl and $PdCl_2$ in an amount of 36.5 g/l and 5 g/l, respectively, to allow easy production of dull black deposit.

The electroless plating solution preferably comprises a slight amount of lead ion dissolved therein to produce palladium black.

In the foregoing formation of the catalyst layer, the electrolytic cell 1 shown in FIG. 1 may be advantageously used because it allows continuous processing.

The hydrogenation reaction chamber 4 is filled with the electroless plating solution while the electrolytic chamber 3 is filled with the electrolytic solution. Under these circumstances, an electric current is applied across the anode 5 and the hydrogen-storing metal plate (cathode) 2 so that hydrogen is produced at the hydrogen-storing metal plate (cathode) 2.

The electrolytic aqueous solution to be injected into the electrolytic chamber 3 preferably does not corrode the hydrogen-storing metal plate 2 and the electrically-conductive plate 2, which acts as an electrode. For example, an aqueous solution of potassium hydroxide is desirable. The hydrogen-storing metal plate 2 on which a catalyst is to be provided is preferably sufficiently rough. This is because the plating reaction can proceed smoothly when the contact area of the hydrogen-storing metal plate with the plating solution is sufficiently large. The hydrogen-storing metal plate 2 is preferably subjected to blast finishing or etching on the surface thereof to be plated in the hydrogenation reaction chamber 4. The degree of such a surface treatment is not specifically limited. The blast finishing may be accomplished by the use of alumina grit having a size of from 15 to 20 meshes. The blast finishing provides an increase of effective surface area twice or three times.

The density of electrolytic current applied during plating may be such that the production of hydrogen gas is not observed on the surface of the hydrogen-storing metal plate 2. In some detail, it is preferably from 0.1 to 10 A/dm$^2$, particularly from 1 to 5 A/dm$^2$. If the current density falls below 0.1 A/dm$^2$, the plating takes too much time. In particular, if a metal having no hydrogen permeability such as platinum is provided as a catalyst, the resulting deposit is so dense that desorption sites on the hydrogen-storing metal plate are blocked, easily inhibiting the plating reaction by atomic hydrogen. On the contrary, if the current density exceeds 10 A/dm$^2$, it accelerates the deformation of metal. Further, the amount of hydrogen gas released from the electrolytic cell increased. The plating metal is deposited more in the form of dendrite. The resulting deposit exhibits a reduced strength.

When a hydrogen-storing metal such as palladium and palladium alloy is allowed to come in contact with hydrogen, it adsorbs hydrogen on the surface thereof from which hydrogen is then adsorbed by the interior of the metal.

When an aqueous electrolytic solution such as an alkali solution is subjected to electrolysis in the electrolytic chamber 3 with the hydrogen-storing metal plate 2 as a cathode provided opposing an anode, hydrogen is produced on the hydrogen-storing metal plate (cathode) 2. In this manner, atomic hydrogen is produced.

$$H_2O + e \rightarrow H_{ad} + OH^- \quad (1)$$

The atomic hydrogen thus produced is then adsorbed as active hydrogen by the surface of the hydrogen-storing metal plate 2 on the electrolytic chamber side. The active hydrogen is then adsorbed deep in the hydrogen-storing metal plate 2 without being desorbed therefrom.

$$H_{ad} \rightarrow H_{ab} \quad (2)$$

$H_{ad}$ represents adsorbed hydrogen, and $H_{ab}$ represents absorbed hydrogen. The active hydrogen which has thus been adsorbed deep in the hydrogen-storing metal plate 2 then diffuses into the hydrogen-storing metal plate 2. Thus, the active hydrogen is then rendered desorbable on the inner side of the hydrogenation reaction chamber 4.

When the hydrogen-storing metal plate 2 which has adsorbed atomic hydrogen is allowed to come in contact with the plating solution containing cations, the cations are reduced by the atomic hydrogen. The material which has thus been reduced and lost electric charge is then deposited on the surface of the hydrogen-storing metal plate 2. At the same time, the atomic hydrogen becomes hydrogen ion which is then desorbed from the hydrogen-storing metal plate 2.

The foregoing reaction mechanism is represented by the following, using palladium for example as a plating metal:

$$Pd^{2+} + 2H_{ab} \rightarrow Pd + 2H^+ \quad (3)$$

If the plating metal is palladium, the deposit can be thickened because palladium can transmit atomic hydrogen. Even if an ion of a metallic component having no capability of adsorbing hydrogen such as platinum, gold and copper is used to plate the hydrogen-storing metal, plating may be effected on one surface of the hydrogen-storing metal plate while atomic hydrogen migrates from the other surface thereof to the one surface thereof. In this manner, the thickness of the deposit of the plating metal is nonuniform over the migration paths of hydrogen. The hydrogen-storing metal is partially exposed on some migration paths. As a result, a thick porous deposit having a very large effective surface area can be obtained. The electroless plating of the hydrogen-storing metal can be effected in the hydrogenation reaction chamber 4 at the same time with the hydrogen adsorption and permeation reaction by electrolysis in the electrolytic chamber 3.

Platinum or gold exhibits characteristics close to that of palladium, although its mechanism is unknown.

The hydrogen-storing metal which has been plated with a specific catalyst may be further plated with another catalyst metal. In order to form another metal layer on the metal plate, electrolytic plating method is normally employed. In accordance with electrolytic plating method, the entire surface of the hydrogen-storing metal can be uniformly covered. Thus, this method is basically not preferred in the present invention. However, if the hydrogen-storing metal has been plated with palladium black to have a sufficient surface area, the upper layer may be formed by electrolytic plating method or electroless plating method.

In order to form a deposit by an electrolytic plating method, an electric current is applied to the electrode thus electrolessly plated while the electrode is being dipped in an electrolytic solution as desired plating solution. Using platinum as an example, the chemical mechanism is given below.

$$Pt^{4+} + 4e \rightarrow Pt \quad (4)$$

The hydrogen production reaction by electrolysis can be appropriately controlled by adjusting the current density within a wide range. The amount of hydrogen which can be adsorbed in the hydrogen-storing metal, if it is palladium or the like, is extremely large, though this will depend on the conditions. When electrolysis is effected at a current density as high as 10 A/dm$^2$ or above with no previous adsorption of hydrogen in the hydrogen-storing metal, hydrogen is produced, but little or no production of gas is observed. Almost all the amount of hydrogen thus produced is immediately completely adsorbed by the hydrogen-storing metal. As hydrogen is adsorbed in the hydrogen-storing metal on one surface thereof, the hydrogenation reaction of, e.g., styrene, proceeds on the reaction chamber side at a rate corresponding to the rate of production of hydrogen. In general, however, a hydrogenation reaction or a hydrogen reduction reaction proceeds at a lower rate than an electrochemical reaction. The inventors made extensive studies of acceleration of hydrogenation reaction or reduction reaction to the rate of production of hydrogen. The present invention has thus been worked out.

The present invention will be further described in the following examples, but the present invention should not be construed as being limited thereto. Unless otherwise indicated, all parts, percents, ratios and the like are by weight.

EXAMPLE 1

Using an electrolytic apparatus as shown in FIG. 2, a palladium plate as a hydrogen-storing metal was plated with palladium black on the surface thereof.

A palladium plate having a thickness of 0.1 mm was inserted as a cathode into an electrolytic cell 1 at the center thereof. A platinum plate having a thickness of 0.5 mm as an anode was provided opposing the cathode in an electrolytic chamber 3. The electrolytic chamber 3 was filled with a 6M aqueous solution of caustic potassium as an electrolytic solution. The cathode plate had a cathode area of 1 cm$^2$.

A reaction chamber 4 was filled with an aqueous solution of palladium chloride as a reaction solution (plating solution, hereinafter referred to as "reaction solution"). Under the following conditions, an electric current was applied to the electrolytic chamber 3 with the reaction chamber 4 filled with the electroless plating solution of palladium chloride so that the palladium plate was electrolessly plated with palladium on the plating chamber side thereof.

Reaction solution: $PdCl_2$ 5 g/dm$^3$+HCl 1 mol/dm$^3$
Current density: 1 A/dm$^2$ (10 mA)
Agitation: None
Electrical quantity: 5C (coulomb)
Reaction formula: $Pd^{2+}+2H.\rightarrow Pd+2H^+$ When the current efficiency was 30%, palladium black was deposited to a thickness of 0.5 μm. When observed on an SEM photograph, a granular deposit having a size of 1 μm was confirmed. The plating of the hydrogen-storing metal with the catalyst was then completed.

Thereafter, a reduction reaction was conducted in the same manner as mentioned above except that the reaction chamber 4 was filled with 4-methylstyrene rather than the foregoing reaction solution. The introduction of the reactant was accomplished by the action of a roller pump through a fluororubber tube. The reaction conditions in the reaction chamber 4 were as follows:

Reaction substrate: 4-Methylstyrene
Temperature: Room temperature
Flow rate: 2.5 ml/min
Loading: 6 ml
Current density: 5 A/dm$^2$ (50 mA)
Electrolysis time: 5 hours Under the foregoing conditions, electrolysis was effected. When the current efficiency was 30%, 4-ethyltoluene was obtained.

COMPARATIVE EXAMPLE 1

The reduction reaction was effected in the same manner as in Example 1 except that palladium black was not deposited on the palladium plate. When the current efficiency was not more than about 0.1%, 4-ethyltoluene was obtained.

EXAMPLE 2

Using the same electrolytic cell 1 as used in Example 1, palladium black was deposited on a palladium plate under the following conditions:

Reaction solution: $PdCl_2$ 5 g/dm$^3$+HCl 1 mol/dm$^3$
Current density: 1 A/dm$^2$ (10 mA)
Agitation: None
Electrical quantity: 36C When the current efficiency was 30%, palladium black was deposited to a thickness of 2.5 μm. The deposit thus formed had a specific surface area of about 500 m$^2$/m$^2$ as determined by BET method. 4-Methylstyrene was then subjected to the same reduction reaction as mentioned above. When the current efficiency was 10%, 4-ethyltoluene was obtained.

Figure 3:
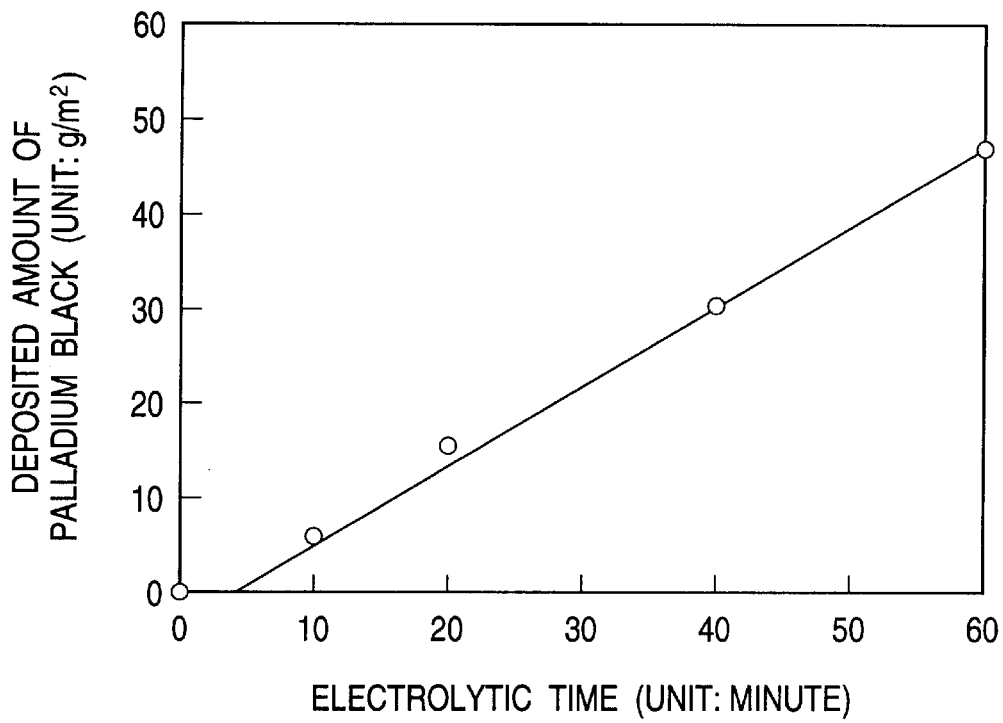
FIG. 3 is a graph illustrating the cumulative amount of palladium black deposited during electrolysis.

FIG. 3 is a graph illustrating the cumulative amount of electrolytically deposited palladium black determined at various times by weight. The current efficiency was 24%.

Figure 4:
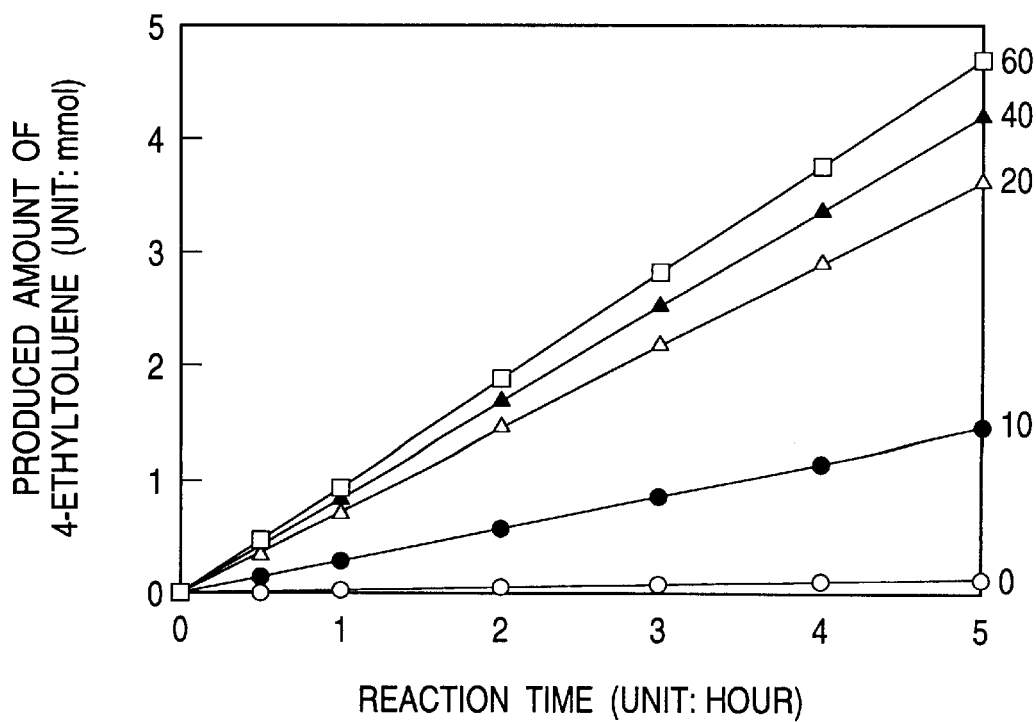
FIG. 4 is a graph illustrating the relationship between the cumulative produced amount of 4-ethyltoluene and the reduction reaction time.

FIG. 4 is a graph illustrating the relationship between the cumulative amount of 4-ethyltoluene produced by a galvano electrostatic electrolytic apparatus at a current density of 5 A/dm$^2$ with various hydrogen-storing metals having palladium black deposited thereon for different periods of time and the reduction reaction time. In the graph, □ indicates the measurements on the hydrogen-storing metal having palladium black deposited thereon for 60 minutes, ▲ indicates the measurements on the hydrogen-storing metal having palladium black deposited thereon for 40 minutes, Δ indicates the measurements on the hydrogen-storing metal having palladium black deposited thereon for 20 minutes, ● indicates the measurements on the hydrogen-storing metal having palladium black deposited thereon for 10 minutes, and ○ indicates the measurements on the hydrogen-storing metal having palladium black deposited thereon for 0 minutes.

Figure 5:
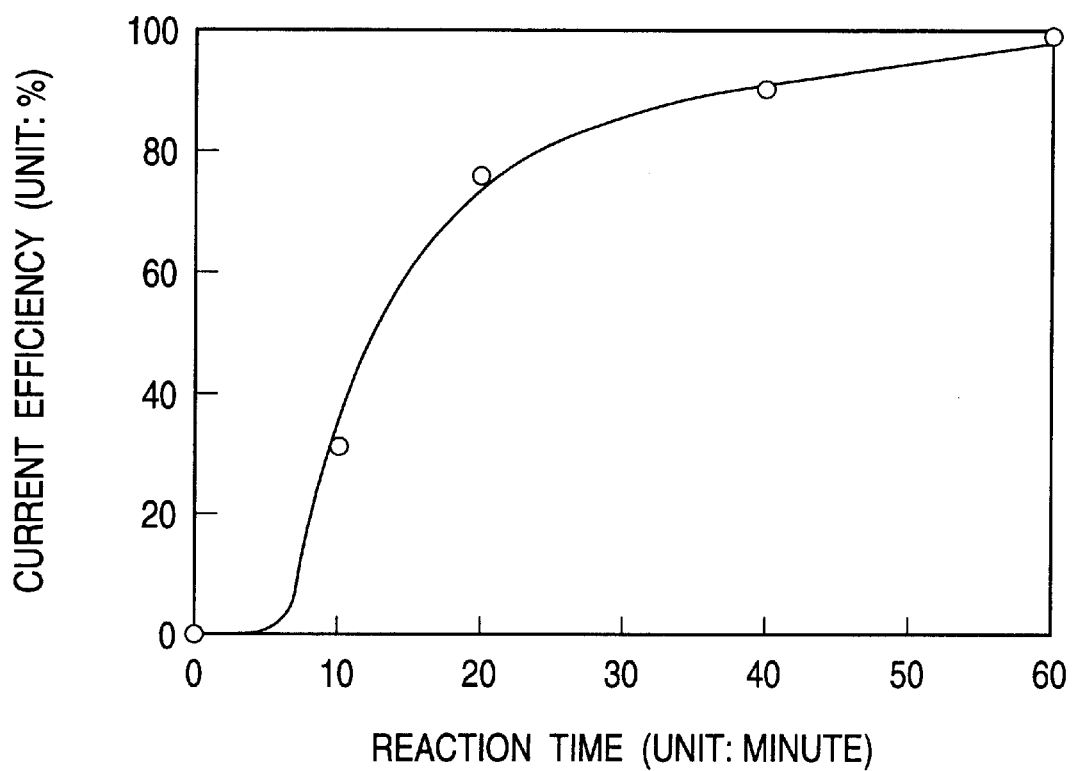
FIG. 5 is a graph illustrating the relationship between the deposition time of palladium and the reaction efficiency of 4-ethyltoluene, wherein in the above Figures the reference numeral 1 indicates an electrolytic cell, the reference numeral 2 indicates a hydrogen-storing metal plate (cathode), the reference numeral 3 indicates an electrolytic chamber, the reference numeral 4 indicates a hydrogenation reaction chamber, the reference numeral 5 indicates an anode, the reference numeral 6 indicates an anodic gas outlet, the reference numeral 7 indicates a reactant solution feed opening, the reference numeral 8 indicates a reflux opening, the reference numeral 9 indicates a power supply, the reference numeral 10 indicates a porous catalyst layer, the reference numeral 11 indicates a circulating tank, and the reference numeral 12 indicates a roller pump.

FIG. 5 is a graph illustrating the relationship between the deposition time during which palladium black is deposited and the reaction efficiency of 4-ethyltoluene.

EXAMPLE 3

Using the same electrolytic cell 1 as used in Example 1, platinum black was deposited by the action of active hydrogen.

Reaction solution: $H_2PtCl_6.6H_2O$ 0.1 mol/l
Electrolytic solution: 6M KOH
Current density: 5 A/dm$^2$ (50 mA)
Agitation: None
Electrical quantity: 6C
Reaction formula: $PtCl_4^{2-}+2H.\rightarrow Pt+4Cl^-+2H^+$ When the current efficiency was 20%, platinum black was deposited to a thickness of 1 μm.

Using the palladium plate having platinum black deposited thereon, electrolysis was effected while 4-methylstyrene was subjected to a reduction reaction in the same manner as in Example 1. When the current efficiency was 30%, 4-ethyltoluene was obtained.

EXAMPLE 4

Using the same electrolytic cell 1 as used in Example 1, palladium black was deposited by the action of active hydrogen. Thereafter, platinum black was produced on the deposit of palladium black.

Conditions of Deposition of Palladium Black
  Reaction solution: $PdCl_2$ 5 $g/dm^3$+HCl 1 $mol/dm^3$
  Current density: 1 $A/dm^2$ (10 mA)
  Agitation: None
  Electrical quantity: 5C
Conditions of Deposition of Platinum Black
  Reaction solution: $H_2PtCl_6.6H_2O$ 0.1 mol/l
  Current density: 5 $A/dm^2$ (50 mA)
  Agitation: None
  Electrical quantity: 6C
  Reaction formula: $PtCl_4^{2-}+2H.\rightarrow Pt+4Cl^-+2H^+$ Using the palladium plate thus obtained, 4-methylstyrene was subjected to a reduction reaction in the same manner as mentioned above. When the current efficiency was 80%, 4-ethyltoluene was obtained.

It can be presumed that since the platinum catalyst is a structure developed on palladium black, the increase of surface area and the catalytic activity are combined to exert the foregoing effect.

EXAMPLE 5

Using the same electrolytic cell 1 as used in Example 1, palladium black was deposited on a palladium plate by the action of active hydrogen. Thereafter, platinum black was electrolytically deposited on the deposit of palladium black. During this process, an electric current was applied to the palladium plate having palladium black deposited thereon as a cathode provided opposing the interior of the electrolytic chamber 3 filled with a plating solution.

Conditions of Deposition of Palladium Black (Electroless Plating)
  Reaction solution: $PdCl_2$ 5 $g/dm^3$+HCl 1 $mol/dm^3$
  Current density: 1 $A/dm^2$ (10 mA)
  Agitation: None
  Electrical quantity: 5C
Conditions of Deposition of Platinum Black (Electrolytic Plating)
  Reaction solution: $H_2PtCl_6.6H_2O$ 0.1 mol/l
  Current density: 5 $A/dm^2$ (50 mA)
  Agitation: None
  Electrical quantity: 6C The cathode thus prepared was then mounted in the same cell in such an arrangement that the platinum black side thereof faces the reaction chamber. Under these conditions, 4-methylstyrene was subjected to reduction reaction in the same manner as mentioned above. When the current efficiency was 70%, 4-ethyltoluene was obtained.

EXAMPLE 6

Using the plated electrode prepared by plating a catalyst in Example 1, acetylene gas was subjected to a reduction reaction in the reaction chamber of the electrolytic cell 1 used in Example 1. The reaction conditions were as follows:
  Reaction substrate: Acetylene
  Temperature: Room temperature
  Flow rate: 2.5 ml/min
  Loading: 5 ml (1 atm)
  Current density: 5 $A/dm^2$ (50 mA)
  Electrolysis time: 5 hours When the current efficiency was 60%, propylene was obtained. When the current efficiency was 30%, propane was obtained.

COMPARATIVE EXAMPLE 2

The reduction reaction procedure of Example 6 was followed except that palladium black was not deposited. When the current efficiency was 40%, propylene was obtained. When the current efficiency was 5%, propane was obtained.

EXAMPLE 7

Using the same electrolytic cell 1 as used in Example 1, gold was deposited by the action of active hydrogen.
  Reaction solution: $HAuCl_4.4H_2O$ 0.1 mol/l
  Electrolytic solution: 6M KOH
  Current density: 5$A/dm^2$ (50 mA)
  Agitation: None
  Electrical quantity: 6C
  Reaction formula: $AuCl_4^{3-}+3H.\rightarrow Au+4Cl+3H^+$ When the current efficiency was 20%, gold was deposited to a thickness of 1.5 µm.

Subsequently, electrolysis was effected at a current density of 0.5 $A/dm^2$ while oxygen gas and pure water were supplied into the reaction chamber at a rate of 20 me and 1 me per minute, respectively, instead of the reaction solution for plating. When the current efficiency was 10%, aqueous hydrogen peroxide having a concentration of 6 ppm was obtained.

COMPARATIVE EXAMPLE 3

The reduction reaction procedure of Example 7 was followed except that gold was not deposited. When the current efficiency was 5%, aqueous hydrogen peroxide having a concentration of 3 ppm was obtained.

EXAMPLE 8

Using the same electrolytic cell 1 as used in Example 1, electrolysis was effected with the reaction chamber 6 being filled with the reaction solution containing 1 cc of lanthanum-nickel alloy powder under the following conditions. Palladium black was produced on the other surface and the powder surface of the cathode.
  Reaction solution: $PdCl_2$ 5 $g/dm^3$+HCl 1 $mol/dm^3$
  Current density: 1$A/dm^2$ (10 mA)
  Agitation: Circulation by pump
  Electrical quantity: 50C
  Reaction formula: $Pd^{2+}+2H.\rightarrow Pd+2H^+$ When the current efficiency was 30%, a granular deposit having a size of 0.1 µm was observed on the powder surface of the cathode on SEM photograph.

As mentioned above, the present invention provides an electrolytic process which comprises effecting electrolysis with a hydrogen-storing metal member as a cathode to produce hydrogen which is then adsorbed by the hydrogen-storing metal member through which it is allowed to migrate to at least a part of the other surface thereof at which it is desorbed and utilized in a hydrogen reaction, wherein the hydrogen-storing metal member is provided with a porous catalyst layer on the surface thereof.

The present invention also provides an electrolytic apparatus using the foregoing electrolytic process. In this arrangement, hydrogen thus adsorbed is desorbed to allow the catalyst to accelerate its reaction with the reactant. Because of its porosity, the catalyst layer has a large surface area at which the reactant can come in contact with hydrogen, making it possible to raise the reaction rate.

Accordingly, even if electrolysis is effected at a great current density to produce hydrogen at a high rate, the hydrogen reaction can be raised correspondingly, making it possible to provide a high current efficiency.

The present invention provides an electrolytic apparatus comprising a hydrogenation reaction applied electrode having a large surface area. It was confirmed that the use of this electrolytic apparatus makes it easy to reduce the reactant unprecedentedly. Thus, the use of this electrolytic apparatus makes it easy to develop a new synthesis process.

While the invention has been described in detail and with reference to specific embodiments thereof, it will be apparent to one skilled in the art that various changes and modifications can be made therein without departing from the spirit and scope thereof.

What is claimed is:

1. An electrolytic process which comprises effecting electrolysis of an electrolytic solution in an electrolytic chamber including an anode separated from a reaction chamber by a hydrogen-storing metal member, with one surface of said hydrogen-storing metal member facing the electrolytic chamber as a cathode and opposing the anode, to produce hydrogen on the cathode surface of said hydrogen-storing metal member, said hydrogen being adsorbed by and transferring through said hydrogen-storing metal member to an opposite side of said hydrogen-storing metal member facing the reaction chamber, and allowing hydrogen thus adsorbed and a material to be treated to undergo continuous catalytic reaction in said reaction chamber on the surface of said hydrogen-storing metal member facing the reaction chamber to cause hydrogenation or reduction reaction by hydrogen thus adsorbed, wherein a porous catalyst layer is provided on a catalytic reaction surface of said hydrogen-storing metal member which is the surface of the hydrogen-storing metal member facing the reaction chamber, and the hydrogen-storing metal member comprises at least one material selected from the group consisting of palladium, palladium alloys, ruthenium, nickel alloys and alloys containing a rare earth element.

2. The electrolytic process as claimed in claim 1, wherein said catalytic reaction is selected from the group consisting of converting methylstyrene to ethyl toluene, cracking reactions of petroleum, and reactions for producing gasoline or kerosene from heavy oil.

3. The electrolytic process as claimed in claim 1, wherein said hydrogen-storing metal member is in the form of a metal plate having a thickness of from 0.01 to 2 mm.

4. The electrolytic process as claimed in claim 1, wherein said porous catalyst layer comprises a platinum group metal.

* * * * *